(No Model.) 2 Sheets—Sheet 1.
H. E. PAINE.
Drive Chain.
No. 237,771. Patented Feb. 15, 1881.
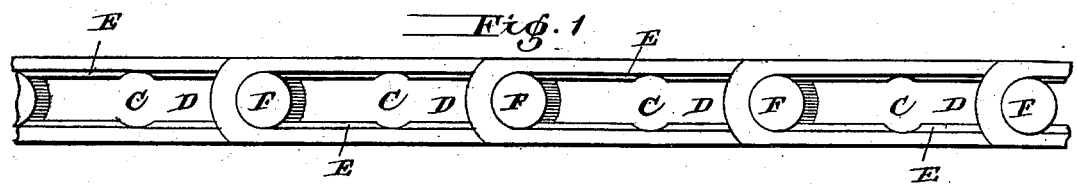
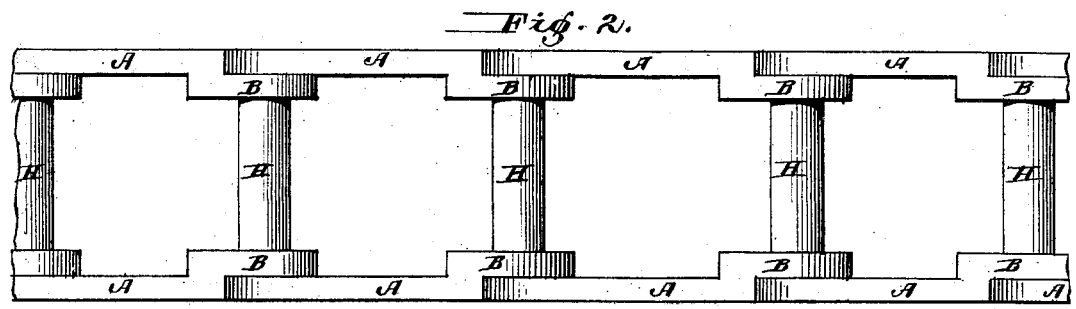
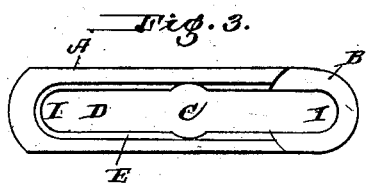
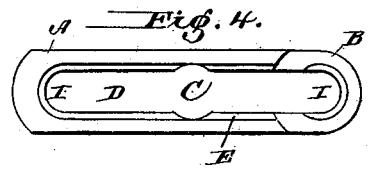
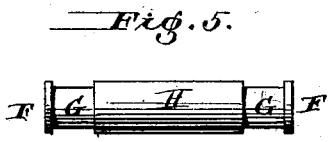
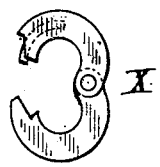
Witnesses:
H. E. Paine Inventor.
By Paine Grafton & Ladd
Attorneys (No Model.) 2 Sheets—Sheet 2.

H. E. PAINE.
Drive Chain.

No. 237,771. Patented Feb. 15, 1881.

Witnesses:

H. E. Paine — Inventor.
By Paine Grafton & Ladd
Attorneys

UNITED STATES PATENT OFFICE.

HALBERT E. PAINE, OF MILWAUKEE, WISCONSIN.

DRIVE-CHAIN.

SPECIFICATION forming part of Letters Patent No. 237,771, dated February 15, 1881.

Application filed November 15, 1880. (No model.)

*To all whom it may concern:*

Be it known that I, HALBERT E. PAINE, a citizen of the United States, residing at Milwaukee, in the county of Milwaukee and State of Wisconsin, have invented certain new and useful Improvements in Drive-Chains; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 8:
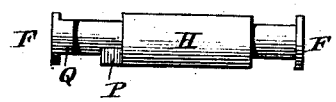
Figure 9:
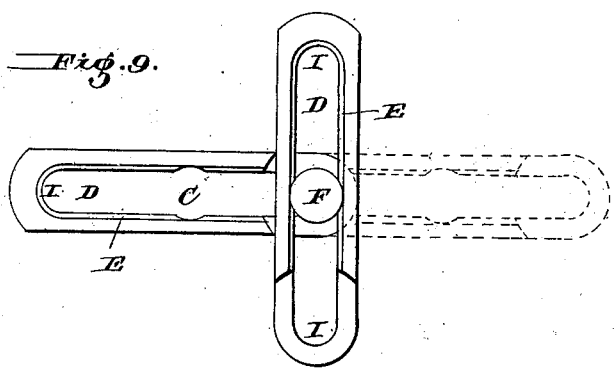
Figure 10:
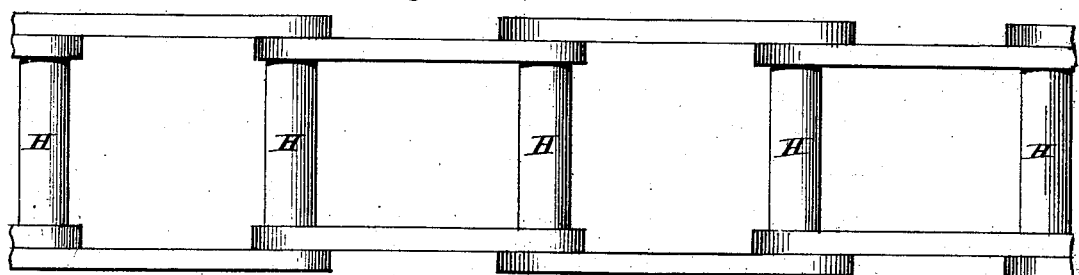
Figure 11:
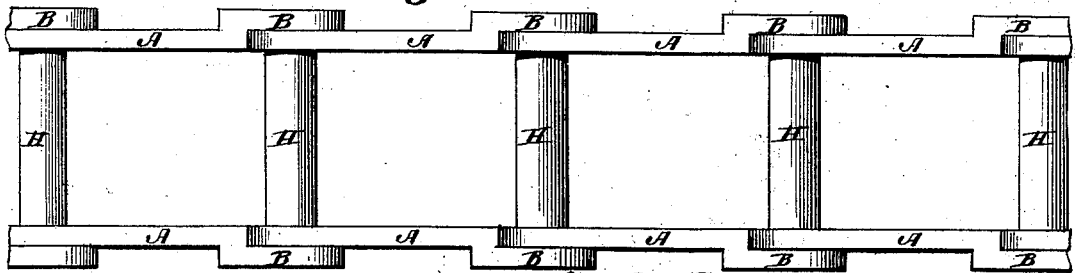

Figure 1 is a side view of the chain in its operative condition. Fig. 2 is a plan of the chain in its operative condition. Fig. 3 shows the outer face of one of the side bars, which are all of the same size and shape and interchangeable with each other. Fig. 4 shows the locking side bar last coupled. It has the extremity of the slot on the shorter part countersunk to receive the head of the key-bolt in coupling the first pair of side bars to the last pair. Fig. 5 represents one of the bolts which couple the side bars. The bolts are all of the same size and shape and interchangeable with each other, except the key-bolt, Figs. 6 and 8. Fig. 6 shows one form of the key-bolt with its collar X. Fig. 7 represents the collar of the key-bolt shown in Fig. 6. It is fastened with a spring, and unfastened for removal by disengaging the spring by means of a nail or rod inserted in the hole S. Fig. 8 is another form of a key-bolt, which is shown but not specifically claimed. Fig. 9 exhibits the mode of coupling the side bars together. Fig. 10 is a plan of a modified form of the chain in which the side bars are all straight. Fig. 11 is a plan of a modified form of the chain in which the inner faces of the side bars are all in the same horizontal planes.

The side bar has a central opening, C, large enough to admit the head F and central part, H, of the bolt. It is formed with an offset at the proper point, between the central opening and one end, so that the inner face of the longer part, A, on one side of the offset is in the same vertical plane with the outer face of the shorter part, B, on the other side, and these two parts A and B are so related to each other that two contiguous side bars may be coupled or uncoupled by the proper manipulation, to be hereinafter explained. The side bar has a longitudinal slot, D, wide enough to admit the journals G, but not the heads F, of the bolt. The semicircular extremities I of the slot D are fitted to the journals G of the bolt. The side bar has a countersunk space, E, around the slot D, deep enough and wide enough to receive the head F of the bolt, so that it shall neither project laterally beyond the outside of the chain nor prevent the sliding of the journal to the extremity of the slot. The two parts A and B of the side bar are so constructed that when the chain is in its operative condition the longer parts, A, of the side bars on either side of the chain will be in the same vertical plane, and will be well closed up to avoid ragged edges.

The length of the journals G of the bolt, Fig. 6, is made equal to twice the thickness of the side bar less once the thickness of the bolthead, so that the shoulders presented by the heads F and central part, H, of the bolts embrace the coupled parts of the contiguous side bars. The longitudinal strain is borne wholly by the journals of the bolts, and not by their heads, which do not fit closely in the countersunk portions of the slots. The central portions, H, of the bolts come in contact with, act upon, and are acted upon by, the cogs of the sprocket-wheels. The metal or other material used in the construction of the chain is properly distributed, so as to equalize the strength of the different parts.

The form of bolt shown in Fig. 6 couples all the chain except the first and last pairs of side bars. It will not couple the last pair to the first, because, if the chain is well made and closely fitted, the side bar to be coupled last will be incapable of lateral motion sufficient to enable its center to pass over and inclose the end of the bolt. The following is one of the modes of obviating this difficulty: An increase of length is given to the opposite journal of the bolt equal to the thickness of the side bar, and the outer face of the side bar to be last coupled is countersunk at the extremity of the slot on the shorter part to receive the bolt-head. The bolt is moved across the chain until the center of the side bar to be last coupled passes over and incloses the bolt, which is then thrust back into position. The collar is then placed in its position on the longer journal of the bolt, and the coupling is completed. Another mode of obviating this difficulty is to construct the key-bolt in the form shown in Fig. 8, with two lugs, P and Q, on the two extremities of the longer journal at right angles with each other, and with a projection equal to the difference between the radius of the journal and the radius of the bolt-head, the lug P being equal in thickness to the side bar, and the thickness of the lug Q and bolt-head together being equal to the thickness of the side bar. The key-bolt in this form is capable of being moved across the chain until the center of the side bar to be coupled last passes over and incloses the head of the bolt. If the chain is then straightened the lug next to the bolt-head causes a partial revolution of the bolt, which brings the other lug against the inner face of the adjacent side bar, so as to keep it in position.

To place the chain in operative condition, insert the head F of a bolt into an opening, C, of a side bar in such a way that the journal G will slide through the slot D to its semicircular extremity I on the short part B of the side bar, the bolt-head sliding through the countersunk part of the slot; insert the opposite head of the bolt in a second side bar in the same way; apply a third side bar to the first in such a way that the central opening, C, of the third will embrace the head of the bolt, and then move the third side bar across the journal of the bolt until the semicircular extremity of the countersunk part of the slot embraces the head of the bolt; turn the third side bar on the journal G until it is in line with the first side bar; couple a fourth side bar with the second, exactly as the third was coupled with the first; proceed in this way to couple the successive side bars in pairs, the first and last pairs being finally connected together to make the endless chain. To couple the last pair of side bars to the first, place the key-bolt, Fig. 6, in the extremities of the slots in the shorter parts of the last pair of side bars, and couple one of the first pair of side bars to the key-bolt at the end which has the longer journal; move the key-bolt across the line of the chain until the center of the side bar last to be coupled passes over and embraces the opposite head of the key-bolt; slide the key-bolt to its place; put the collar on the inner extremity of the longer journal.

If the form of key-bolt shown in Fig. 8 is used, the necessary modifications in the process of coupling the last pair of side bars to the first will be obvious.

To uncouple the chain, reverse these operations.

The chain shown in Fig. 10 has straight side bars, but is otherwise like that shown in Fig. 2, except that the slots of the alternate side bars are countersunk throughout their entire length, while the slots of the other side bars are not countersunk at all.

The chain shown in Fig. 11 is like that shown in Fig. 2, except that in Fig. 11 the inner faces, and in Fig. 2 the outer faces, of the side bars are in the same vertical planes, and in Fig. 11 the slot of the shorter part is countersunk.

The form shown in Fig. 2 is the preferred form. The others are not specifically claimed in this application.

As many of the key-bolts may be used as shall suit the convenience of the operator.

I claim—

1. A drive chain formed of two parallel lines of slotted side bars and independent cross-bolts having heads which engage with said side bars, as and for the purpose set forth.

2. In a drive-chain, a side bar having a longitudinal slot, D, provided with an enlarged portion, C, in combination with a cross-bolt having a head, F, as and for the purpose set forth.

3. In a drive-chain, a side bar having a slot, D, and countersunk outer face, E, in combination with a cross-bolt having head F, as and for the purpose set forth.

4. In a drive-chain, an independent cross-bolt, H, provided with heads F, in combination with a pair of slotted side bars, as and for the purpose set forth.

5. In a drive-chain, the side bar, A, made with the lateral offset B, and having the longitudinal slot D, with enlargement C, in combination with a cross-bolt having heads F, as and for the purpose set forth.

6. In a drive-chain formed of slotted side bars and cross-bolts, a side bar having the countersink E, in combination with the cross-bolt H, having the heads F, necks G, and the divided collar X, as and for the purpose set forth.

In testimony whereof I affix my signature in presence of two witnesses.

H. E. PAINE.

Witnesses:
RUTLEDGE WILLSON,
A. M. LONG.